(12) United States Patent
Iyengar et al.

(10) Patent No.: US 7,814,267 B1
(45) Date of Patent: Oct. 12, 2010

(54) PROCESSOR WITH COMPARE OPERATIONS BASED ON ANY OF MULTIPLE COMPARE DATA SEGMENTS

(75) Inventors: Vinay Raja Iyengar, Cupertino, CA (US); Venkat Rajendher Reddy Gaddam, Sunnyvale, CA (US); Aparna Bharat, Cupertino, CA (US)

(73) Assignee: Netlogic Microsystems, Inc., Santa Clara, CA (US)

( * ) Notice: Subject to any disclaimer, the term of this patent is extended or adjusted under 35 U.S.C. 154(b) by 342 days.

(21) Appl. No.: 12/012,618

(22) Filed: Feb. 4, 2008

(51) Int. Cl.
*G06F 13/00* (2006.01)
*G06F 13/28* (2006.01)

(52) U.S. Cl. .................. 711/108; 707/758; 711/206; 711/207

(58) Field of Classification Search .................. None
See application file for complete search history.

(56) References Cited

U.S. PATENT DOCUMENTS

| | | | | |
|---|---|---|---|---|
| 4,959,811 A * | 9/1990 | Szczepanek | ............. | 365/49.17 |
| 5,438,535 A * | 8/1995 | Lattibeaudiere | .......... | 365/49.17 |
| 6,219,748 B1 * | 4/2001 | Srinivasan et al. | .......... | 711/108 |
| 6,243,281 B1 | 6/2001 | Pereira | | |
| 6,324,087 B1 | 11/2001 | Pereira | | |
| 6,473,846 B1 * | 10/2002 | Melchior | .................... | 711/170 |
| 6,502,163 B1 | 12/2002 | Ramankutty | | |
| 6,542,391 B2 | 4/2003 | Pereira et al. | | |
| 6,606,681 B1 * | 8/2003 | Uzun | ......................... | 711/108 |
| 6,711,041 B2 | 3/2004 | Pereira et al. | | |
| 6,744,652 B2 | 6/2004 | Srinivasan et al. | | |
| 6,795,325 B1 | 9/2004 | Inoue | | |
| 6,804,230 B1 * | 10/2004 | Jennings et al. | ............. | 370/388 |
| 6,906,936 B1 | 6/2005 | James et al. | | |
| 6,934,796 B1 * | 8/2005 | Pereira et al. | ............... | 711/108 |
| 6,967,855 B2 | 11/2005 | Srinivasan et al. | | |
| 6,988,164 B1 * | 1/2006 | Wanzakhade et al. | .... | 365/49.17 |
| 6,993,622 B2 | 1/2006 | Khanna et al. | | |
| 7,117,300 B1 * | 10/2006 | James et al. | ................. | 711/108 |
| 7,194,573 B1 * | 3/2007 | Saxtorph et al. | ............ | 711/108 |
| 7,219,188 B1 * | 5/2007 | Pereira | ........................ | 711/108 |
| 7,260,675 B1 * | 8/2007 | Bhugra et al. | ............... | 711/108 |
| 7,401,180 B1 * | 7/2008 | James et al. | ................. | 711/108 |
| 7,469,317 B2 * | 12/2008 | Robotham | ................... | 711/118 |
| 7,565,482 B1 * | 7/2009 | Rangarajan et al. | ......... | 711/108 |
| 2005/0169031 A1 * | 8/2005 | Khanna | ........................ | 365/49 |
| 2006/0010284 A1 * | 1/2006 | Srinivasan et al. | .......... | 711/108 |
| 2008/0263270 A1 * | 10/2008 | Birman et al. | .............. | 711/108 |

* cited by examiner

*Primary Examiner*—Pierre M Vital
*Assistant Examiner*—Augustine Obisesan
(74) *Attorney, Agent, or Firm*—Haverstock & Owens, LLP

(57) ABSTRACT

A processor device integrated circuit can include a plurality of storage locations logically configurable into at least one database. Such a database can include a number of records, record having a selectable size of up to F multi-bit segments, where F is an integer greater than one. A search key application circuit can apply a search key value of up to F multi-bit segments to the at least one database in response to receiving one search key segment value. The one search key segment can be applied as any of the F multi-bit segments according to a segment selection value.

19 Claims, 12 Drawing Sheets

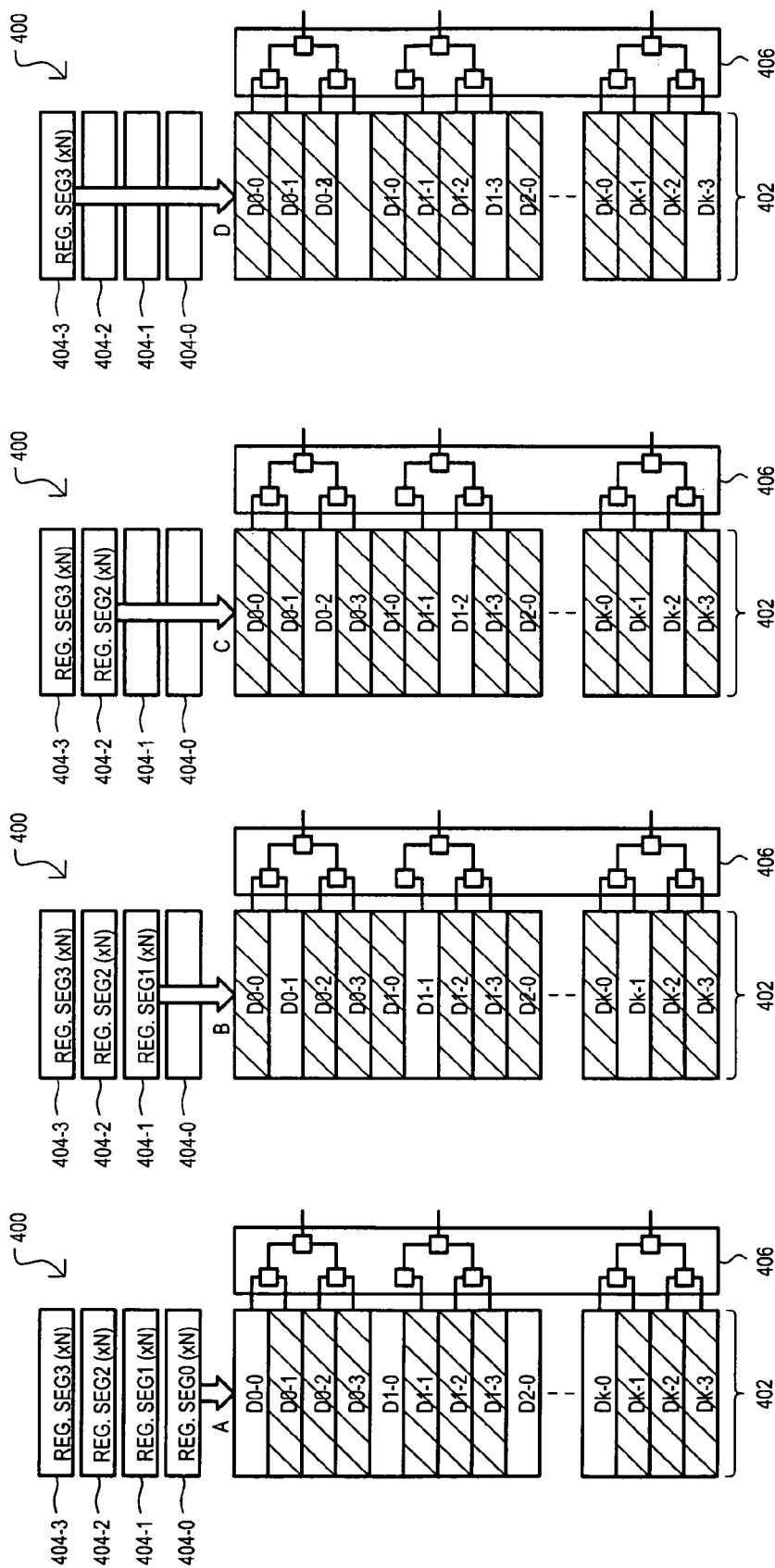

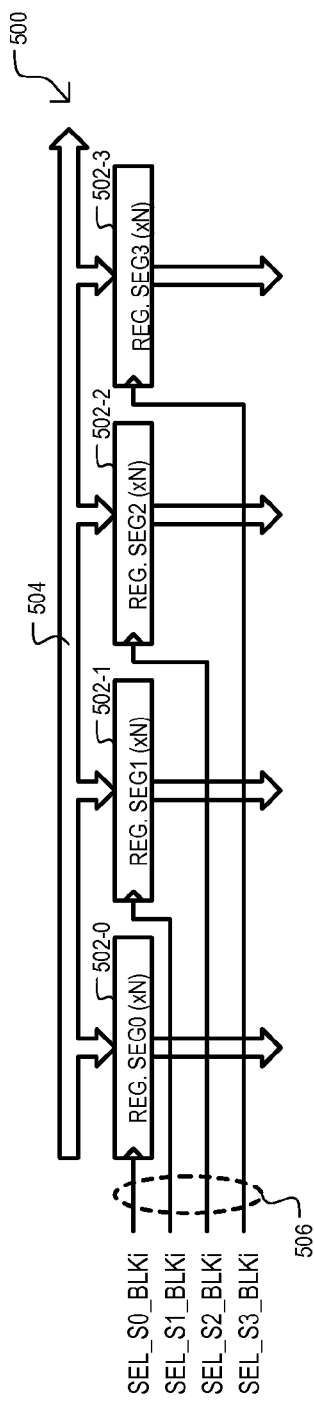
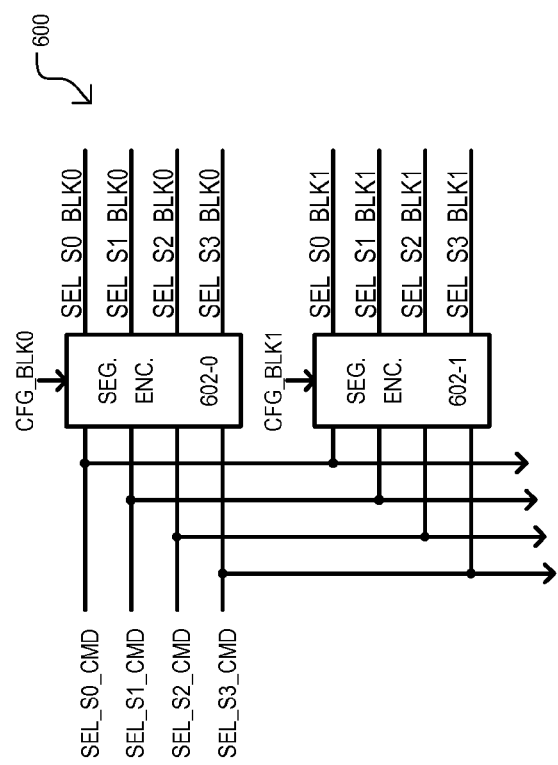
FIG. 5
FIG. 6A
FIG. 6B

| CMD | CMP_SEG | SEL_S0_CMD | SEL_S1_CMD | SEL_S2_CMD | SEL_S3_CMD | BLK_SIZE | SEL_S0_BLKi | SEL_S1_BLKi | SEL_S2_BLKi | SEL_S3_BLKi | CMP_ACT |
|---|---|---|---|---|---|---|---|---|---|---|---|
| WR SEG0 | N/A | 1 | 0 | 0 | 0 | xN | 1 | 1 | 1 | 1 | 0 |
| WR SEG0 | N/A | 1 | 0 | 0 | 0 | x2N | 1 | 1 | 1 | 0 | 0 |
| WR SEG0 | N/A | 1 | 0 | 0 | 0 | x4N | 1 | 1 | 0 | 0 | 0 |
| WR SEG1 | N/A | 0 | 1 | 0 | 0 | xN | 1 | 1 | 1 | 1 | 0 |
| WR SEG1 | N/A | 0 | 1 | 0 | 0 | x2N | 0 | 1 | 1 | 1 | 0 |
| WR SEG1 | N/A | 0 | 1 | 0 | 0 | x4N | 0 | 1 | 1 | 0 | 0 |
| WR SEG2 | N/A | 0 | 0 | 1 | 0 | xN | 1 | 1 | 1 | 1 | 0 |
| WR SEG2 | N/A | 0 | 0 | 1 | 0 | x2N | 1 | 0 | 1 | 1 | 0 |
| WR SEG2 | N/A | 0 | 0 | 1 | 0 | x4N | 0 | 0 | 1 | 1 | 0 |
| WR SEG3 | N/A | 0 | 0 | 0 | 1 | xN | 1 | 1 | 1 | 1 | 0 |
| WR SEG3 | N/A | 0 | 0 | 0 | 1 | x2N | 1 | 1 | 0 | 1 | 0 |
| WR SEG3 | N/A | 0 | 0 | 0 | 1 | x4N | 0 | 1 | 0 | 1 | 0 |
| WR CMP | 0 | 1 | 0 | 0 | 0 | xN | 1 | 1 | 1 | 1 | 1 |
| WR CMP | 0 | 1 | 0 | 0 | 0 | x2N | 1 | 1 | 1 | 0 | 1 |
| WR CMP | 0 | 1 | 0 | 0 | 0 | x4N | 1 | 1 | 0 | 0 | 1 |
| WR CMP | 1 | 0 | 1 | 0 | 0 | xN | 1 | 1 | 1 | 1 | 1 |
| WR CMP | 1 | 0 | 1 | 0 | 0 | x2N | 0 | 1 | 1 | 1 | 1 |
| WR CMP | 1 | 0 | 1 | 0 | 0 | x4N | 0 | 1 | 1 | 0 | 1 |
| WR CMP | 2 | 0 | 0 | 1 | 0 | xN | 1 | 1 | 1 | 1 | 1 |
| WR CMP | 2 | 0 | 0 | 1 | 0 | x2N | 1 | 0 | 1 | 1 | 1 |
| WR CMP | 2 | 0 | 0 | 1 | 0 | x4N | 0 | 0 | 1 | 1 | 1 |
| WR CMP | 3 | 0 | 0 | 0 | 1 | xN | 1 | 1 | 1 | 1 | 1 |
| WR CMP | 3 | 0 | 0 | 0 | 1 | x2N | 1 | 1 | 0 | 1 | 1 |
| WR CMP | 3 | 0 | 0 | 0 | 1 | x4N | 0 | 1 | 0 | 1 | 1 |

FIG. 8B

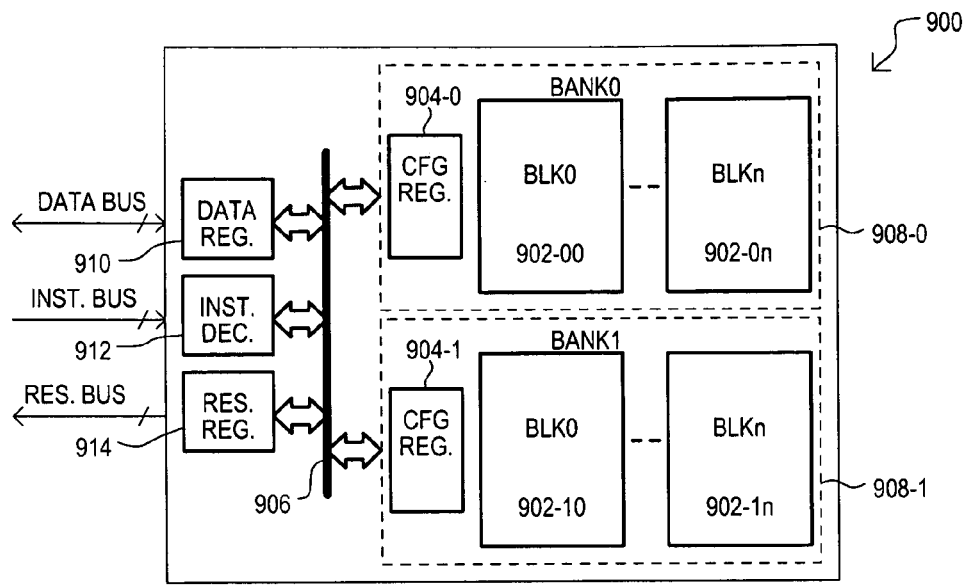

| CFG. REG. | | |
|---|---|---|
| REGISTER TYPE | BANK | ADDRESS |
| ⋮ | | |
| DEVICE CONFIGURATION REGISTER | 0 | 00A0 |
| LOGICAL TABLE REGISTER | 0 | 005F:0040 |
| BLOCK CONFIGURATION REGISTER | 0 | 008F:0080 |
| ⋮ | | |
| DEVICE CONFIGURATION REGISTER | 1 | 00A0 |
| LOGICAL TABLE REGISTER | 1 | 005F:0040 |
| BLOCK CONFIGURATION REGISTER | 1 | 008F:0080 |
| ⋮ | | |

FIG. 9C

| DEVICE CONFIGURATION REGISTER | |
|---|---|
| BIT | DESCRIPTION |
| 67 | BLOCK KEY PERSISTENCE<br>Enable = 1<br>Disable = 0 |
| 65 | COMPARE ON ANY SEGMENT<br><br>Enable = 1<br>Disable = 0 |

| LOGICAL TABLE REGISTER | |
|---|---|
| BIT | DESCRIPTION |
| 35:33 | 000 = Compare on SEG0<br>001 = Compare on SEG1<br>010 = Compare on SEG2<br>011 = Compare on SEG3<br>100 = Compare on SEG4<br>101 = Compare on SEG5<br>110 = Compare on SEG6<br>111 = Compare on SEG7 |
| 13:9 | LOGICAL TABLE ID |
| 8:4 | LOGICAL TABLE MASK |
| 3:0 | OTHER |

FIG. 9D

| BLOCK CONFIGURATION REGISTER | |
|---|---|
| BIT | DESCRIPTION |
| 31:9 | OTHER |
| 8:4 | LOGICAL TABLE ID |
| 3:0 | BLOCK WIDTH |

FIG. 9E

| |
|---|
| WRITE REG. COMPARE WITH LOGIC TABLE 00 |
| WRITE REG. COMPARE WITH LOGIC TABLE 01 |
| WRITE REG. COMPARE WITH LOGIC TABLE 02 |
| ⋮ |
| WRITE REG. COMPARE WITH LOGIC TABLE 1F |

FIG. 10A

| |
|---|
| WRITE REG. COMPARE WITH SEG0 |
| WRITE REG. COMPARE WITH SEG1 |
| WRITE REG. COMPARE WITH SEG2 |
| ⋮ |
| WRITE REG. COMPARE WITH SEG7 |

FIG. 10B

PROCESSOR WITH COMPARE OPERATIONS BASED ON ANY OF MULTIPLE COMPARE DATA SEGMENTS

TECHNICAL FIELD

The present invention relates generally to processor devices that can compare a search key against stored database records, and more particularly to processor devices that can compare with search key values composed of multiple segments.

BACKGROUND OF THE INVENTION

To assist in providing rapid searches of database records, integrated circuits have been manufactured that store database records, and rapidly compare (e.g., search) such records with a search key value (also referred to as a compare data value, or comparand). Such integrated circuits can include search engine devices and/or knowledge based processor devices.

To accommodate various types of compare operations, it can be desirable to provide databases of different sizes. Commonly, databases can have record sizes that are multiples of a smallest record size. As but one example, one database can store records of N-bit width, while others can store records that having widths of N×2, N×4, or N×8. A value N is commonly 72-bits.

In one type of conventional arrangement, for databases having larger record width sizes, a search key value can be loaded with a series of write commands that each write all but a last section of the search key value into a compare register, typically in a particular order. Compare operations can then be executed by entering the last section of the search key, usually with an instruction that starts (i.e., launches) a compare operation utilizing the now complete search key value. In such arrangements the last section of the search key is restricted to one particular segment. For example, for a record width arrangement like that noted above (144-bit, 288-bit, or 576-bit), the compare launch segment (the last segment written to initiate the compare operation) is restricted to the least significant bits (bits 0:71).

BRIEF DESCRIPTION OF THE DRAWINGS

FIGS. 4A to 4C-3 are block schematic diagrams showing operations of a physical block according to embodiments of the invention.

FIG. 5 is a block schematic diagram showing an example of a search key register according to an embodiment.

FIGS. 6A and 6B show examples of a search key register segment control circuit according to an embodiment.

FIGS. 8A and 8B show another example of a command processing circuit according to an embodiment.

FIG. 9A is a block diagram showing a processor device according to another embodiment of the invention. FIG. 9B shows a configuration register set that can be included in the embodiment of FIG. 9A. FIG. 9C shows one example of a device configuration register that can be included in the set of FIG. 9B. FIG. 9D shows one example of a logical table register that can be included in the set of FIG. 9B. FIG. 9E shows one example of a block configuration register that can be included in the set of FIG. 9B.

FIGS. 10A and 10B show examples of single compare commands that can target any segment of a multi-segment search key.

DETAILED DESCRIPTION

Various embodiments of the present invention will now be described in detail with reference to a number of drawings. The embodiments show processor devices and methods that can execute compare operations based on any segment of a multi-segment search key value.

Figure 1:
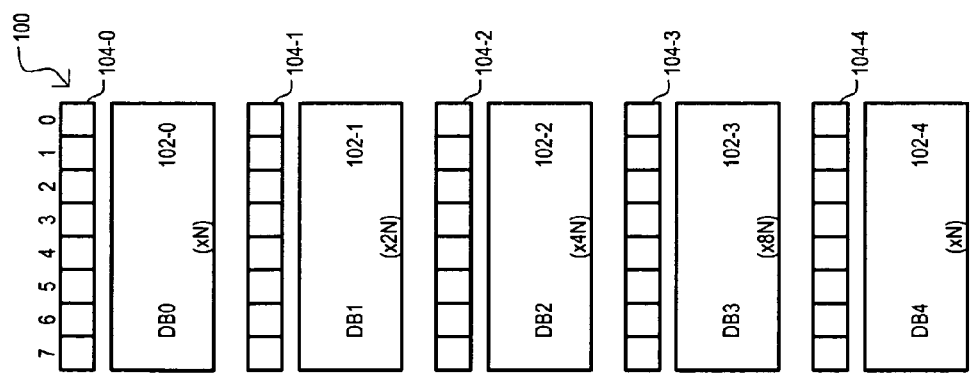
FIG. 1 is a diagram showing a processor device according to a first embodiment of the invention.

Referring now to FIG. 1, a processor device according to a first embodiment is shown in a block schematic diagram and designated by the general reference character 100. A processor device 100 can include a number of databases 102-0 to 102-4, each with a corresponding search key storage circuit 104-0 to 104-4. It is understood that databases (102-0 to 102-4) can be configurable structures. That is, while FIG. 1 shows five databases, the processor device 100 could be configured to fewer or larger numbers of databases according to configuration settings. Said in another way, databases (102-0 to 102-4) are logical collections of storage locations configured for a common size.

Databases (102-0 to 102-4) can each include a number of record storage locations. The size of record storage locations can be uniform within the same database, but vary between different databases. In the particular example of FIG. 1, database 102-0 (DB0) and 104-4 (DB4) can store record of minimum size (e.g., minimum segment size), which in this case is N-bits. Other databases can have record sizes that are multiples of this minimum segment size, such as exponents of two (size= $2^j$, where j=0-3 in this case). In the example shown, database 102-1 (DB1) can have record widths of size 2N, data base 102-2 (DB2) can have record widths of size 4N, data base 102-3 (DB3) can have record widths of size 8N. In one very particular arrangement, N can be 72-bits.

Each search key storage circuit (104-0 to 104-4) can have storage locations to accommodate search key widths up to a maximum record width size. In the example of FIG. 1, a maximum record width is assumed to be 8N, thus each search key storage circuit (104-0 to 104-4) has a width of 8N. Further, each search key storage circuit (104-0 to 104-4) can be divided into separately writable storage segments, each of the minimum record size. Thus, in FIG. 1, each search key storage circuit (104-0 to 104-4) can include eight storage segments, N-bits wide, to which data can be written.

FIG. 1 identifies different storage segments of search key storage circuit 104-0 by labels "0" to "7". In the following description the storage segments of the other search key storage circuits (104-1 to 104-4) will be referred to by the same convention.

The manner in which a received search key segment is stored in a search key storage circuit (104-0 to 104-4) can vary according to the size of its corresponding database. That is, search key storage circuits (104-0 to 104-4) are configurable according to the size of the records searched. Thus, in the example of FIG. 1, search key storage circuits 104-0 and 104-4 are configured as xN, search key storage circuit 104-1 is configured as x2N, search key storage circuit 104-2 is configured as x4N, and search key storage circuit 104-3 is configured as x8N.

Having described the general logical arrangement of a processor device 100 according to one embodiment, the operation of such a device will now be described in a series of views.

Referring now to FIGS. 2A to 2H, examples of various operations of the processor device 100 of FIG. 1 are shown in block diagram form. Each of FIGS. 2A to 2H shows a different operation on processor device 100. In one particular arrangement, each such operation can be executed in response to a single instruction to the processor device 100.

Figure 2B:
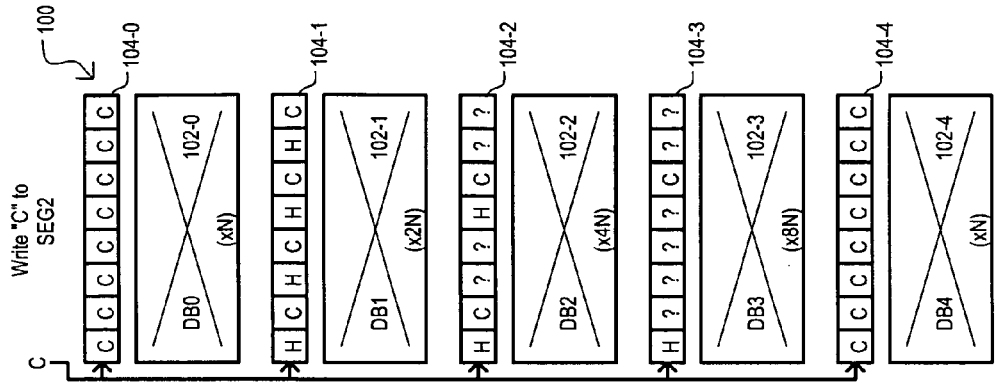
FIGS. 2A to 2H are block diagrams showing various operations of the processor device shown in FIG. 1.
Figure 2A:
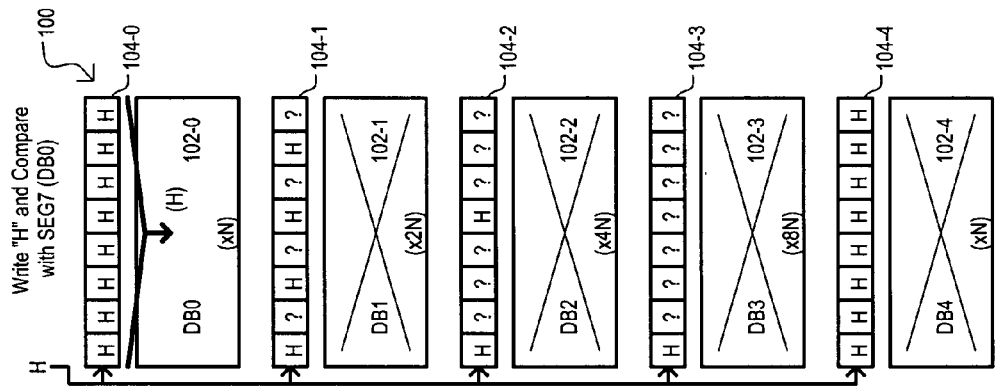

Referring now to FIG. 2A, a write and compare operation according to an embodiment of the invention is shown in diagrammatic form. The write and compare operation can execute a write to a particular segment of the search key storage circuits, and then execute a compare operation on a targeted database. The very particular operation shown in FIG. 2A shows a write and compare operation for a search key segment value "H" directed to segment 7 of a search key value. The value "H" is understood to have a minimum segment size (i.e., N-bits). As shown in FIG. 2A, the manner in which a received search segment is written into a search key storage circuit can vary according to the size configuration of the search key storage circuit.

Referring still to FIG. 2A, search key storage circuits 104-0 and 104-4 are configured as xN. That is, these storage circuits are configured for a minimum segment size. In such an arrangement, a received search key segment value can be replicated across all segments of the storage circuits (104-0 and 104-4). Thus, these search key storage circuits have search segment H in all segment locations (0-7).

Search key storage circuit 104-1 has a x2N configuration. In such an arrangement, a received segment value "H" can be replicated to represent one segment of multiple x2N search key values. In the very particular example shown, this can include replicating the received search key segment value across all odd number segments if the write operation is directed to an odd segment, and replicating the received search key segment value across all even number segments if the write operation is directed to an even segment. FIG. 2A shows a write operation directed to segment 7, thus the value "H" is replicated in odd search key segments 1, 3, 5 and 7 of search key storage circuit 104-1.

Search key storage circuit 104-2 has a x4N configuration. In such an arrangement, the value "H" can be replicated to represent one segment of two identical x4N search key values. In the very particular example shown, this can include commonly writing segment pairs 0/4, 1/5, 2/6 and 3/7. FIG. 2A shows a write operation directed to segment 7, thus, the value "H" is replicated in search key segments 3 and 7 of search key storage circuit 104-2.

Search key storage circuit 104-3 has a x8N configuration. In such an arrangement, the value "H" is written to one segment location, and not replicated. That is, storage circuit 104-3 is configured for a maximum search key size, thus a received search key segment value is stored only in the indicated segment, which in this case is segment 7.

Once the search key segment "H" has been received in search key storage circuits 104-0 to 104-4, a compare operation can be executed on one or more targeted databases. In the example shown, the targeted database is 102-0 (DB0), thus value "H" is compared against records in DB0.

Referring now to FIG. 2B, a write for compare operation according to an embodiment of the invention is shown in diagrammatic form. A write for compare operation can write a value to a particular segment of the search key storage circuits without execution of a compare operation.

The very particular operation shown in FIG. 2B shows a write operation for a search key segment value "C" directed to segment 2 of a search key value. The value "C" is understood to have a minimum segment size. In the FIG. 2B, search key storage circuits can operate in the same general fashion as FIG. 2A, varying according to size configuration.

In the case of search key storage circuits 104-0 and 104-4, value "C" can be replicated in all segment locations.

In the case of search key storage circuit 104-1, because the write operation is directed to an even numbered segment (segment 2), the value "C" can be replicated in all even numbered segment locations (0, 2, 4 and 6).

In the case of search key storage circuit 104-2, the value "C" can be replicated in locations 2 and 6.

In the case of search key storage circuit 104-3, the value "C" is not replicated, and stored at the targeted segment (segment 2).

Figure 2E:
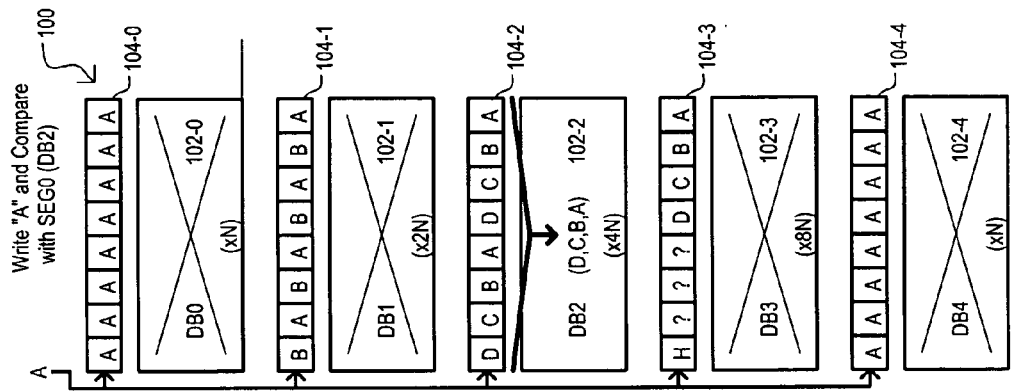
Figure 2D:
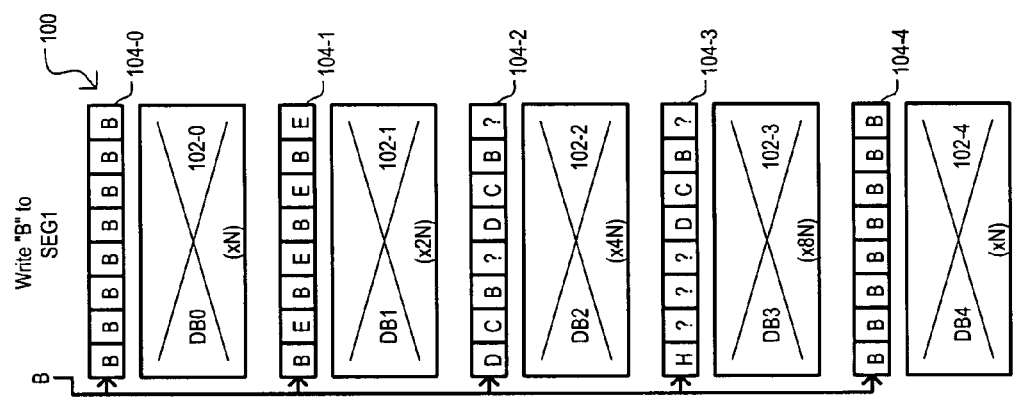
Figure 2C:
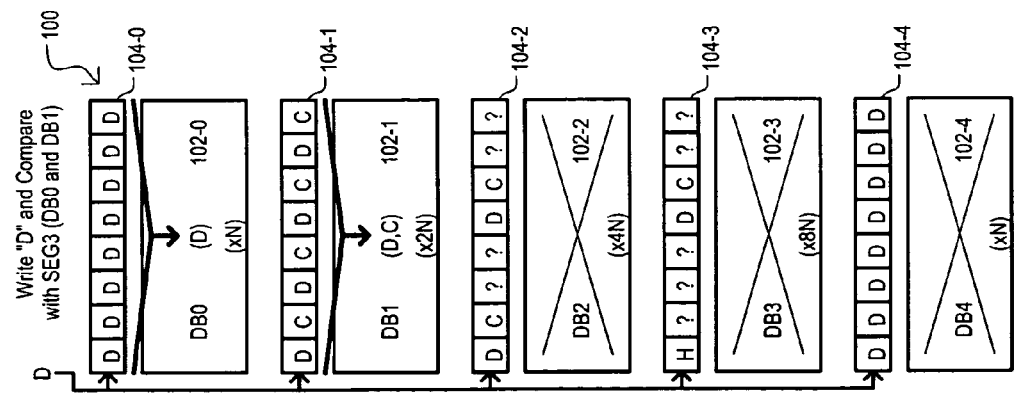

Referring now to FIG. 2C, a write and compare operation like that of FIG. 2A is shown in a block diagram. However, in FIG. 2C the write operation is for a search key segment value "D" directed to segment 3 of a search key value. Further, the compare operation is to be executed on databases 102-0 (DB0) and 102-1 (DB1). The search key storage circuits (104-0 to 104-4) can operate in the same general fashion as FIG. 2A with some differences.

In the case of search key storage circuits 104-0 and 104-4, value "D" can be replicated in all segment locations.

In the case of search key storage circuit 104-1, the value "D" is directed to odd locations, and thus is replicated in all odd locations (1, 3, 5 and 7), replacing value "H" stored at these locations in a previous operation.

In the case of search key storage circuit 104-2, the value "D" can be replicated in locations 3 and 7, replacing value "H".

In the case of search key storage circuit 104-3, the value "D" is not replicated, and stored at targeted segment 3.

Once the search key segment "D" has been received in the search key storage circuits, a compare operation can be executed on the targeted databases DB0 and DB1. Thus, in targeted database 102-0 (DB0), value "D" can be compared against records in DB0, while at the same time, in targeted database 102-1 (DB1), value "D,C" (a two segment search key value) can be compared against records in DB1.

Referring now to FIG. 2D, a write for compare operation like that of FIG. 2B is shown. The very particular operation of FIG. 2D shows a write operation for a search key segment value "B" directed to segment 1 of a search key value.

In search key storage circuits 104-0 and 104-4, value "B" can be replicated in all segment locations. In search key storage circuit 104-1, the value "B" can be replicated in odd numbered segment locations (1, 3, 5 and 7). In search key storage circuit 104-2, the value "B" can be replicated in locations 1 and 5. In the case of search key storage circuit 104-3, the value "B" is not replicated, and stored at targeted segment 1.

Referring now to FIG. 2E, a write and compare operation is shown like that of FIGS. 2A and 2C. In FIG. 2E, the write operation is for a search key segment value "A" and is directed to segment 0. The corresponding compare operation is to be executed on databases 102-2 (DB2).

In search key storage circuits 104-0 and 104-4, value "A" can be replicated in all segment locations. In search key storage circuit 104-1, the value "A" can be replicated in even numbered segment locations. In search key storage circuit 104-2, the value "D" can be replicated in locations 0 and 4. At this time, search key storage circuit 104-2 now has a complete four segment search key value D,C,B,A. In the case of search key storage circuit 104-3, the value "A" is stored only at targeted segment 0.

Once the search key segment "A" has been received in the search key storage circuits, a compare operation can be executed on the targeted database DB2. Thus, in database 102-2 (DB2), value "D,C,B,A" can be compared against the four segment wide records of this database.

Figure 2H:
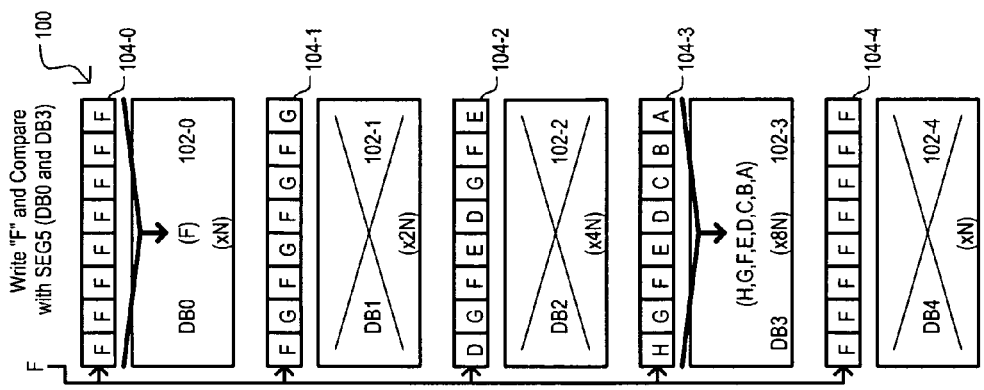
Figure 2G:
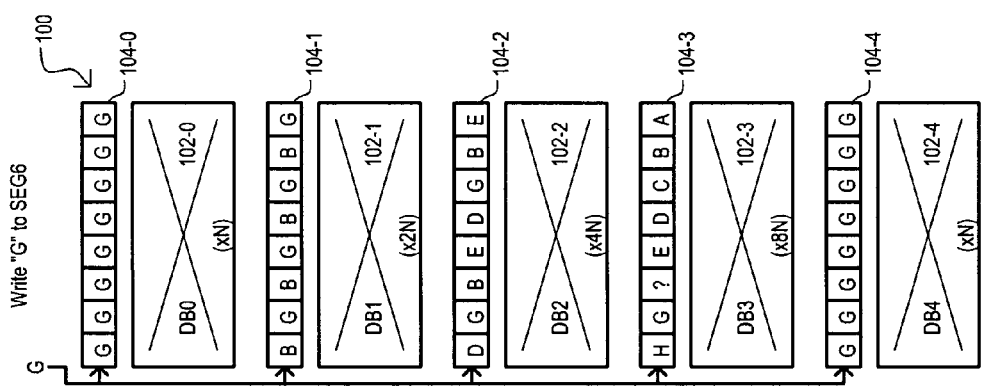
Figure 2F:
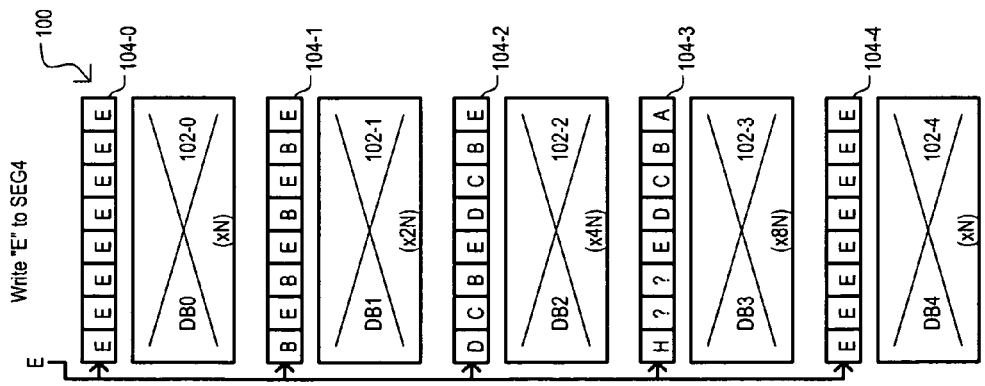

FIGS. 2F and 2G show the write for compare operations that write values "E" and "G" to segment locations 4 and 6, respectively. These operations are understood from the above descriptions for FIGS. 2B and 2D, and so will not be described in detail.

Referring now to FIG. 2H, a write and compare operation is shown like that of FIGS. 2A, 2C, and 2E. In FIG. 2H, the write operation is for a search key segment value "F" and is directed to segment 5. The corresponding compare operation is to be executed on databases 102-0 (DB0) and 102-3 (DB3).

In search key storage circuits 104-0 and 104-4, value "F" can be replicated in all segment locations. In search key storage circuit 104-1, the value "F" can be replicated in odd numbered segment locations. In search key storage circuit 104-2, the value "F" can be replicated in locations 1 and 5. In the case of search key storage circuit 104-3, the value "F" can be stored only at targeted segment 5. At this time, search key storage circuit 104-4 can store a complete eight segment search key.

Once the search key segment "F" has been stored in the search key storage circuits, a compare operation can be executed on the targeted databases DB0 and DB3. Thus, in database 102-0 (DB0), a value "F" can be compared against records that are one segment wide, while in the same operation, a value "H,G,F,E,D,C,B,A" can be compared against records of database 102-3 (DB3) that are eight segments wide.

It is understood that segment masking can be utilized to accommodate databases having widths other than $N*2^j$. As but one very particular example, for a database of width 6N, segments 7 and 6 can be masked from a compare operation.

In this way, a processor device can launch compare operations on receipt or application of any segment of a multi-segment search key value. Such an arrangement can allow for more compare operations be executed in a given time period, as one database can be searched (e.g., a xN database) while a search key segment for a wider database (e.g. a x2N, x4N or x8N database) is written, or the wider database itself is searched with the new search key segment.

The above embodiments have represented device processor structures according to logical arrangements. It is noted that such logical arrangements can be produced by the configuration and mapping of physical storage structures. Examples of possible physical structures for accomplishing such logical arrangements of a device processor will now be described.

Figures 3A, 3B, 3C:
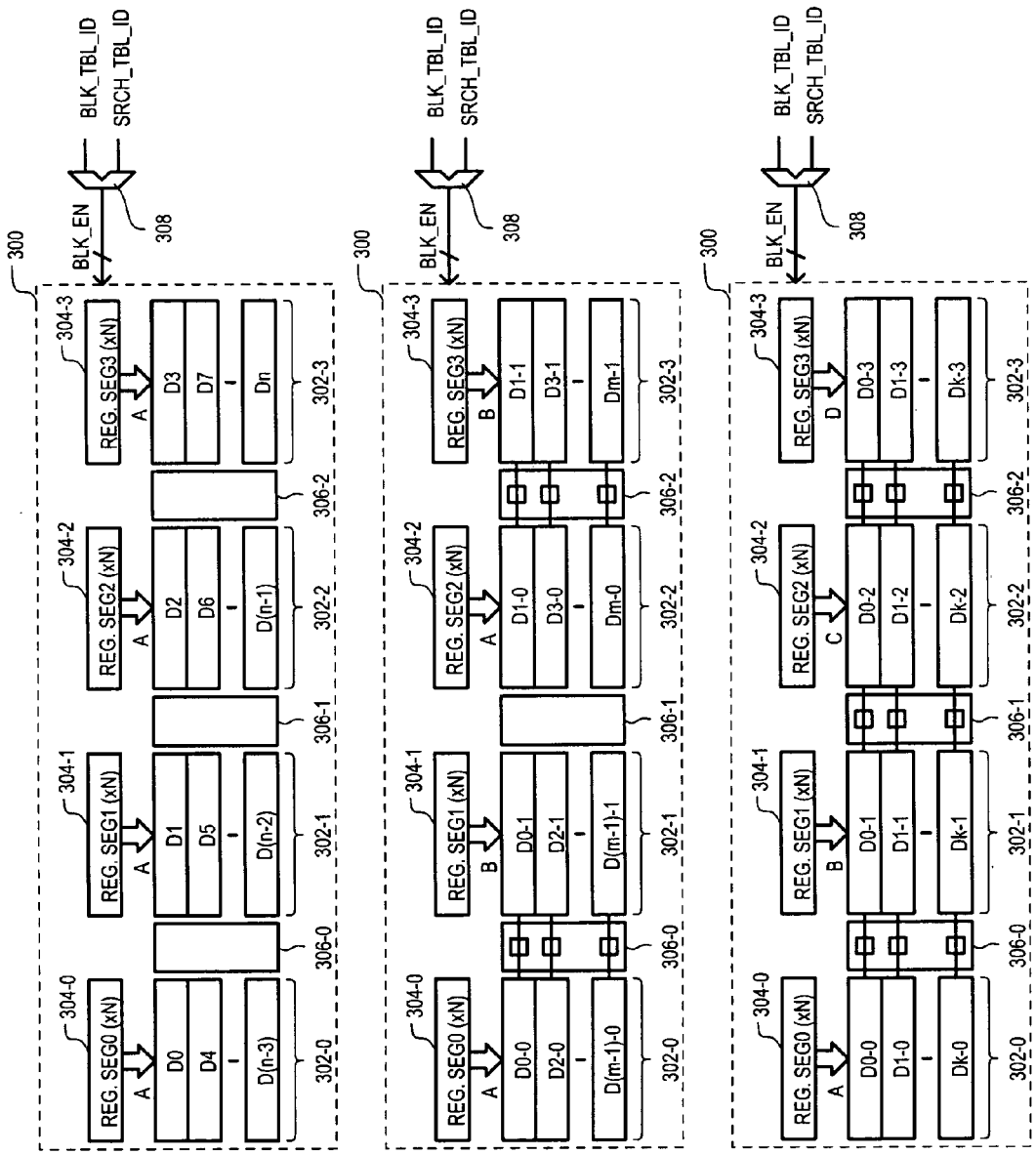
FIGS. 3A to 3C are block schematic diagrams showing operations of a physical block according to embodiments of the invention.

Referring to FIGS. 3A to 3C, one example of a physical block arrangement for a device processor is shown in block schematic diagram, and designated by the general reference character 300. A physical block arrangement 300 can include a number of array sections 302-0 to 302-3, each with a corresponding register segment 304-0 to 304-3. Combining logic 306-0 to 306-2 can be situated between array sections. In addition, a physical block arrangement 300 can have a block access circuit 308.

Array sections (302-0 to 302-3) can have a physical width, in this case N-bits, and include a number of locations for storing a record segment value for comparison with a corresponding search key segment. In one very particular arrangement, array sections (302-0 to 302-3) can be content addressable memory (CAM) cell arrays, with CAM cells of a same location generating a match result on a match line. Such CAM cells can be binary CAM cells, ternary CAM cells (CAM cells that can mask a compare operation), or pseudo ternary CAM cells (CAM cells that can provide masking on a bitwise basis for multiple locations).

Register segments 304-0 to 304-3 can apply a stored data value to array sections 302-0 to 302-3, respectively. As but one example, register segments (304-0 to 304-3) can drive compare data lines corresponding to each bit location within the corresponding array section (302-0 to 302-3).

Combining logic 306-0 to 306-2 can selectively combine match results from locations of different array sections, depending upon a size configuration of the physical block arrangement. Thus, a physical block arrangement 300 can be configured to accommodate database records of different sizes.

A block access circuit 308 can determine if a compare operation is to take place in the physical block based on a comparison of a block table identification value (BLK_TBL_ID) specific to the physical block 300 and a search table identification value (SRCH_TBL_ID) corresponding to the compare operation. If such values are determined to match one another, a compare operation can take place in the physical block 300. However, if such values are determined not to match one another, the physical block 300 can be excluded from the compare operation. Exclusion from compare operations can be accomplished through various methods. As but a few examples, a search key value can be prevented from being applied to the physical block, physical block locations can be disabled (e.g., not precharged, forced into non-matching states), or match results for the physical block can be ignored. Preferably, comparisons between values BLK_TBL_ID and SRCH_TBL_ID can be maskable compare operations.

FIGS. 3A to 3C shows a physical block 300 configured between xN, x2N and x4N widths, respectively. Register segments (304-0 to 304-3) can be loaded with search key segment values in the same general fashion shown in FIGS. 2A to 2H. However, in the arrangement of FIGS. 3A to 3C, a maximum record and search key size is 4xN, and not 8xN.

FIG. 3A shows a compare operation for a physical block arrangement 300 in a xN configuration. In such an arrangement, each array section (302-0 to 302-3) can store individual records of width N at each storage location. Such records are shown as D0 to Dn. In addition, a same compare data segment of width xN (in this case "A") can be stored across all register segments (304-0 to 304-3). Combining logic (306-0 to 306-2) in the xN configuration does not combine match results between array sections. Thus, each storage location in the array section (302-0 to 302-3) can generate a separate match result.

In the compare operation of FIG. 3A, value "A" can be applied from each register segment (304-0 to 304-3) to the corresponding array section (302-0 to 302-3). A match result can generated at each location. "Hit" match results (i.e., match results that indicate a search key segment matches a stored data value) within each array section (302-0 to 302-3) can have a physical priority with respect to one another. Further, each array section can have a priority with respect to one another. Such location and section priority can enable the generation of one highest priority hit match result for a record of size N (or a miss match result).

FIG. 3B shows a compare operation for a physical block arrangement 300 in a x2N configuration. In such an arrangement, storage locations of two different array sections can be combined to store an individual record of size 2N. In the particular arrangement of FIG. 3B, locations from array section 302-0 can be combined with array section 302-1 and locations from array section 302-2 can be combined with array section 302-3. Such individual records are shown as location combinations D0-0/1 to Dm-0/1. Register segments (304-0 to 304-3) can store a replicated 2N search key value. Thus, register segments 304-0 and 304-2 store a first N-bit portion ("A") of 2N search key value, while register segments 304-1 and 304-3 store a second N-bit portion ("B") of 2N search key value. Combining logic (306-0 to 306-2) in the x2N configuration can combine match results between locations within different array sections, as noted above. Thus, storage location pairs in the array sections (302-0 and 302-1) and storage location pairs in the array sections (302-2 and 302-3) can generate match results.

In the compare operation of FIG. 3B, a value "A" can be applied from register segment 304-0 to generate partial match results for one set of records, and a value "B" can be applied from register segment 304-1 to generate the remainder of a match result for the set of records. In a similar fashion, a value "A" can be applied from register segment 304-2 to generate a partial match result for a second set of records, and a value "B" can be applied from register segment 304-3 to generate the remainder of match results for this second set of records.

The partial match results can be combined by combining logic 306-0 and 306-2 to generate full match results. Such full match results can have a physical priority with respect to one another. Such priority can enable the generation of one highest priority hit match result for a record of size 2N (or a miss match result).

FIG. 3C shows a compare operation for a physical block arrangement 300 in a x4N configuration. In such an arrangement, storage locations from all array sections can be combined to store an individual record of size 4N. In the particular arrangement of FIG. 3C, individual records are shown as location combinations D0-0, 1, 2, 3 to Dk-0, 1, 2, 3. Register segments (304-0 to 304-3) can store a single 4N search key value, A,B,C,D. Combining logic (306-0 to 306-2) in the x4N configuration can combine match results between locations within all array sections.

In the compare operation of FIG. 3C, a value "A" can be applied from register segment 304-0 to generate partial match results in array section 302-0, a value "B" can be applied from register segment 304-1 to generate partial match results in array section 302-1, a value "C" can be applied from register segment 304-2 to generate partial match results in array section 302-2, and a value "D" can be applied from register segment 304-3 to generate partial match results in array section 302-3.

The partial match results can be combined by combining logic 306-0 to 306-3 to generate full match results. Such full match results can have a physical priority with respect to one another. Such priority can enable the generation of one highest priority hit match result for a record of size 4N (or a miss match result).

It is noted that compare operations on each array section (302-0 to 302-3) do not necessarily have to be executed simultaneously. That is, compare operations on array sections can be staggered in time with respect to one another.

In this way, multiple search key register segments can be provided for physical blocks to enable search key segments to vary according to a size configuration of record sizes in the physical blocks.

While the arrangement of FIGS. 3A to 3C show register segments that can apply search key segments to only corresponding array sections, alternate embodiments can include arrangements in which multiple registers can all access a same group of storage locations. One such arrangement is shown in FIGS. 4A to 4C-3.

FIGS. 4A to 4C-3, show another example of a physical block arrangement for a device processor, designated by the general reference character 400. A physical block arrangement 400 can include an array 402, multiple register segments 404-0 to 404-4, and combining logic 406. Array section 402 can have a physical width at least as wide as a minimum segment size, which in this case can be N-bits. Array section can include a number of locations for storing a data segment value for comparison with a corresponding search key segment. As in the case of FIGS. 3A to 3C, an array section 402 can be one or more CAM cell arrays.

Register segments 404-0 to 404-4 can apply a stored data value to array section 402. In one particular case, each of register segments (404-0 to 404-4) can drive a same set of compare data lines corresponding to each bit location within array section 402.

Combining logic 406 can selectively combine match results for groups of locations in array 402 depending upon a size configuration of the physical block.

As in the case of FIGS. 3A to 3C, FIGS. 4A to 4C-3 shows a physical block 400 that can be configured between xN, x2N and x4N widths. Register segments (404-0 to 404-4) can be loaded with search key segment values in the same general fashion shown in FIGS. 2A to 2H.

In particular embodiments, compare operations in a physical block arrangement 400 can be restricted with a block access circuit (not shown), like that shown as 308 in FIGS. 3A to 3C.

Figures 1, 4B:
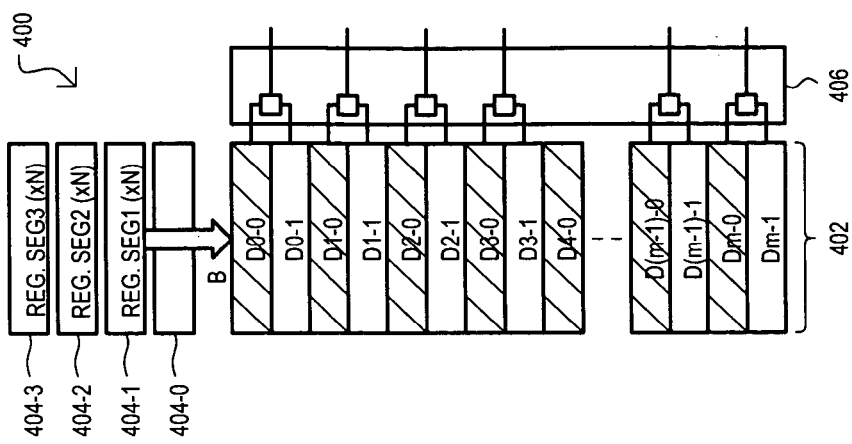
Figures 0, 4B:
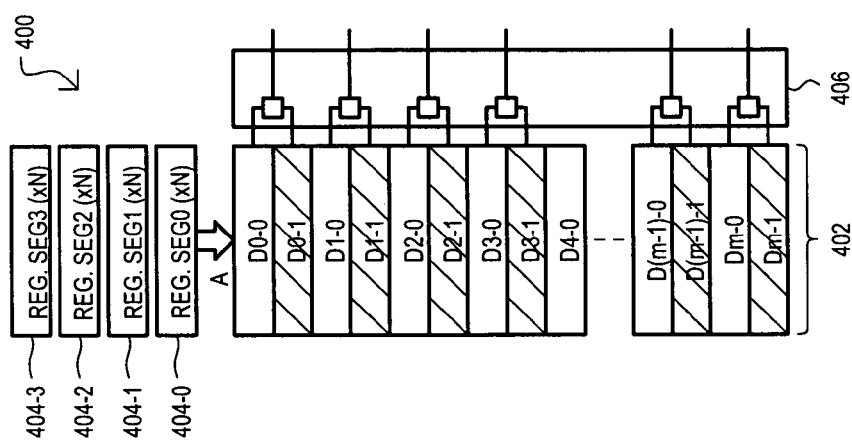
Figure 4A:
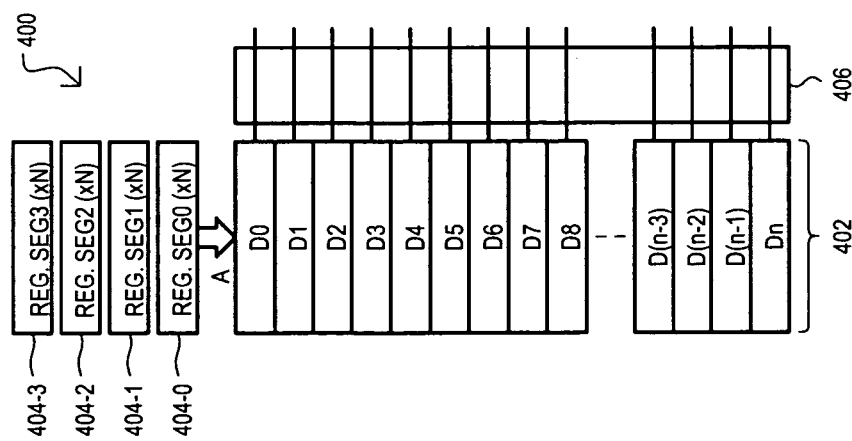

Referring now to FIG. 4A, a compare operation for a physical block arrangement 400 in a xN configuration is shown. In such an arrangement, array section 402 stores individual records (D0 to Dn) of width N at each storage location. Compare segment 404-0, and optionally the remaining compare segments 404-1 to 404-3, can store a compare data segment "A".

In the compare operation of FIG. 4A, value "A" can be applied from register segment 404-0 to array section 402. A match result can be generated at each location, with hit match results (i.e., match results that indicate a search key segment matches a stored data value). The locations can have a physical priority with respect to one another, such as a priority encoder, for example.

FIGS. 4B-0 and 4B-1 show a compare operation for a physical block arrangement 400 in a x2N configuration. In such an arrangement, storage locations of size N can be combined to store individual records of size 2N. Such individual records are shown as location combinations D0-0/1 to Dm-0/1. Register segment 404-0 (and optionally register segment 404-2) can store one portion ("A") of 2N search key value. Register segment 404-1 (and optionally register segment 404-3) can store the other portion ("B") of the search key value.

In the compare operation of FIGS. 4B-0, a value "A" can be applied from register segment 404-0 (or optionally 404-2) and compared only against first portions of record values (e.g., D0-0, D1-0, D2-0 . . . ). Second portions of the record values (e.g., D0-1, D1-1, D2-1 . . . ) can be excluded from the compare operation (and so are shown with hatching in FIGS. 4B-0). Such exclusion from compare operations can be accomplished by masking such locations to force a miss, or ignoring match results from such locations, as but two examples. This can generate partial match results for the set of records.

In the compare operation of FIGS. 4B-1, a value "B" can be applied from register segment 404-1 (or optionally 404-3) and compared only against second portions of the record values while first portions are excluded from the compare operation. This can generate second partial match results for the set of records.

Combining logic 406 can combine match results from adjacent locations of array sections 402 to generate complete match results for the 2N entries.

FIGS. 4C-0 to 4C-3 show a compare operation for a physical block arrangement 400 in a x4N configuration. In such an arrangement, groups of four storage locations from array 402 can be combined to store an individual record of size 4N. In the particular arrangement of FIGS. 4C-0 to $C-3, individual records are shown as location combinations D0-0, 1, 2, 3 to Dk-0, 1, 2, 3. Register segments (404-0 to 404-4) can store a single 4N search key value, A,B,C,D.

In the compare operation of FIGS. 4C-0, a value "A" can be applied from register segment 404-0 and compared against only a first location (e.g., D0-0, D2-0, D3-0 . . . ) of every group of four locations. Second, third and fourth locations of the group of four locations can be excluded from the compare operation (and so are shown with hatching in FIGS. 4C-0).

FIGS. 4C-1 to 4C-3 show successive compares targeted to the remaining three locations within each group of four, with the non-targeted locations being excluded from such compares. This can generate partial match results for the set of records. Combining logic 406 can combine results from each group of four locations to generate complete results for each 4N entry.

In this way, multiple search key register segments can be provided for physical blocks and apply search key segments according to a size configuration of record sizes in the physical blocks.

It is noted that multi-segment compare operations can use combinations of the approaches shown in FIGS. 3A-3C and 4A to 4C-3. That is, certain portions of multi-segment database values can be compared and combined as shown in FIGS. 3B and/or 3C to generate partial results, and such partial results can be combined as shown in FIGS. 4B-0/1 and/or 4C-0, 1, 2, 3.

In this way, physical blocks can be configurable to separately apply different segments of a search key value.

Referring now to FIG. 5, a search key register circuit is shown in a block schematic diagram, and designated by the general reference character 500. In very particular arrangements, a search key register circuit 500 can form register segments like those shown in FIGS. 3A to 4C-3.

The search key register circuit 500 of FIG. 5 can include a number of register segments 502-0 to 502-3, a data bus 504, and control signal inputs 506. Register segments (502-0 to 502-3) can have inputs commonly connected to data bus 504, and can have outputs that provide search key segments to one or more storage locations (not shown). In addition, each register segment (502-0 to 502-3) can be separately controlled (clocked to load a value from data bus 504) according to signals (SEL_S0_BLKi, SEL_S1_BLKi, SEL_S2_BLKi, SEL_S3_BLKi) received at control signal inputs 506. Such an arrangement can allow search key segment values to be loaded into any of register segments (502-0 to 502-3) according to a write command or write and compare command, like those shown in FIGS. 2A to 2H. (It being understood that in an arrangement like that of FIGS. 2A to 2H there can be eight register segments and not four).

In particular embodiments, the structure of FIG. 5 can be repeated for each physical block of a processor device containing multiple physical blocks.

In this way, a device processor can have segment register sets corresponding to each physical block, with each register segment being separately controllable.

Referring now to FIGS. 6A and 6B a register segment control circuit is shown in a block schematic diagram and a logic table. A register segment control circuit can generate signals that separately control each register segment of a register circuit, to enable any segment of a multi-segment search key value to be received.

FIG. 6A shows a register segment circuit 600 that can provide control signals for multiple physical blocks. A register segment circuit 600 can include a segment encoder corresponding to each physical block. FIG. 6A shows control signals for two physical blocks, and thus includes segment encoders 602-0 and 602-1.

Each segment encoder (602-0 and 602-1) can receive a set of command selection signals (SEL_0_CMD, SEL_1_CMD, SEL_2_CMD, SEL_3_CMD) and can encode such signals according to a size configuration value (CFG_BLK0, CFG_BLK1). The resulting encoded signals (SEL_S0_BLK0-3 and SEL_S1—BLK0-3) can be block register select signals that can load data into register segments, such as an arrangement like that of FIG. 5.

FIG. 6B is a table showing one example of an encoding operation for a segment encoder, like that shown as 602-0 and 602-1 in FIG. 6A. The table includes a column set for three different configurations, xN, x2N and x4N.

As shown in the table, in a xN configuration, in response to the activation of any command selection signals (SEL_0_CMD, SEL_1_CMD, SEL_2_CMD, SEL_3_CMD) all block register select signals can be activated (driven to a level 1, in the particular example of FIG. 6B).

In a x2N configuration, in response to the activation of command selection signals SEL_0_CMD or SEL_2_CMD, block register select signals SEL_0_CMD and SEL_2_CMD can be activated. In response to the activation of command selection signals SEL_1_CMD or SEL_3_CMD, block register select signals SEL_1_CMD and SEL_3_CMD can be activated.

In a x4N configuration, there can be a one to one correspondence between the activation of command selection signals SEL_0_CMD to SEL_3_CMD and block register select signals SEL_1_CMD and SEL_3_CMD, respectively.

In this way, search key segments can be loaded individually with portions of compare data values.

The generation of command encoding signals, like those shown as SEL_0_CMD, SEL_1_CMD, SEL_2_CMD, SEL_3_CMD, SEL_4_CMD in FIGS. 6A and 6B can be generated in response to command input values. Examples of circuits for generating such signals are shown in FIGS. 7 to 8B.

Figure 7:
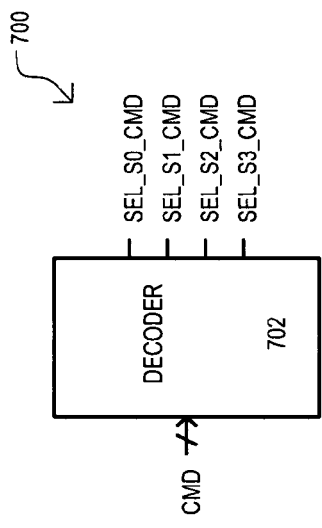
FIG. 7 shows a first example of a command processing circuit according to an embodiment.

Referring to FIG. 7, one example of a command processing circuit is shown. A command processing circuit 700 can include a decoder circuit 702 that can decode command values CMD to activate selected command selection signals SEL_0_CMD to SEL_3_CMD. In such an arrangement, a search key segment can be targeted directly to launch a compare operation.

Figure 8A:
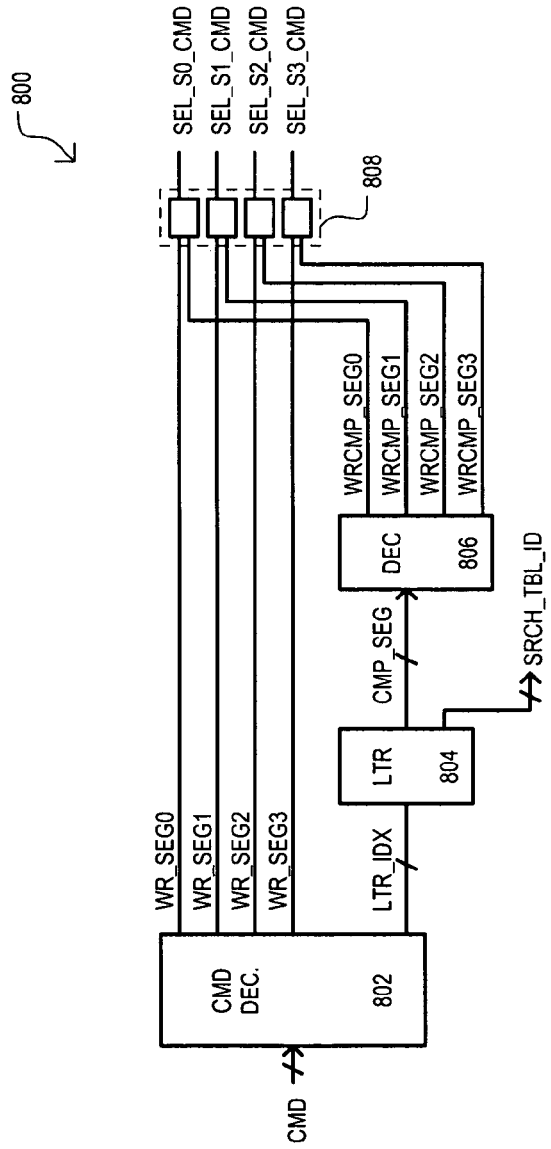

FIGS. 8A and 8B show another example of command processing circuit. FIG. 8A is a block schematic diagram of a command processing circuit, while FIG. 8B is table showing the operation of signal generation circuit. FIGS. 8A and 8B show an arrangement in which a search key segment can be targeted indirectly to launch a compare operation, by indexing a table. Such an arrangement can allow multiple search profiles to be stored and accessed, where each such profile can indicate a particular compare data value upon which a compare operation can be initiated.

Referring to FIG. 8A, a signal generation circuit 800 is shown in which compare segment value (i.e., segment upon which a compare operation can be launched), can be selected from a register according to a command, rather than by the command itself, as shown in FIG. 7. A signal generation circuit 800 can include a command decoder 802, a search table register 804, a decoder 806, and logic 808. A command decoder 802 can receive commands for execution by a processor device. In the particular example of FIG. 8A, these commands can include writes-for-compare operations and write-and-compare-with-register operations. In response to particular write-for-compare operations, command decoder 802 can activate a signal WR_SEGi (where i varies from 0 to 3). In response to write-and-compare-with-register (WR_CMP), search table register 804 can generate a value LTR_IDX, which can access a predetermined entry within search table register 804. Such an entry can store a compare segment value CMP_SEG that identifies a search key segment for compare.

A search table register 804 can include a number of registers that each store criteria for a given search. In the example of FIG. 8A, each search table register entry can include a compare segment value (CMP_SEG) as well as a search table identification (ID) value (SRCH_TBL_ID). A search table ID value can identify a particular search table for a compare operations. For example, a processor device can include a number of physical tables, each with an assigned table ID value. In a write-and-compare-with-register operation, compare operations will only be executed on those physical blocks determined to match the accessed search table ID. Entries to A decoder 806 can decode a compare segment value to activate a write compare signal value (WRCMP_SEGi).

Logic 808 can activate a command selection signal (SEL_S0_CMD, SEL_S1_CMD, SEL_S2_CMD, SEL_S3_CMD) based on either signals WR_SEGi and WRCMP_SEGi.

FIG. 8B is a table showing one example of how signals can be generated in response to commands and register values. FIG. 8B includes a column CMD that indicates an issued command, a column CMP_SEG that indicates a compare segment value (such as that accessed from a search table register), resulting command selection values (SEL_S0_CMD to SEL_S3_CMD), a column BLK SIZE that indicates a block size value for a targeted physical block, and resulting block selection signals for a targeted physical block (SEL_S0_BLKi to SEL_S3_BLKi). FIG. 8B further shows a signal CMP_ACT that can indicate when a compare operation takes place (e.g., when a search key value is applied to a corresponding physical block).

In this way, segment select values can be generated in response to command inputs. Such segment select values can then access different combinations of register segments, according to a size configuration of such register segments.

Referring now to FIG. 9A, a processor device according to another embodiment is shown in a block diagram and designated by the general reference character 900. A processor device 900 can include a number of physical blocks 902-00 to 902-1n, configuration register sets 904-0 to 904-1, and a data bus 906. In the particular example shown, processor device 900 includes a first bank 908-0 that includes physical blocks 902-00 to 902-0n and register set 904-0, and a second bank 908-1 that includes memory cell blocks 902-10 to 902-1n and register set 904-1.

Physical blocks (902-00 to 902-1n) can store record values, and can be configurable to store different size record values. Further, physical blocks can be assigned a table ID value to allow blocks to commonly form a same logical table. Preferably, physical blocks (902-00 to 902-1n) are CAM cell blocks.

A configuration register set 904-0 and 904-1 can be associated with each bank (908-0 and 908-1) and can store values the dictate block and compare values for indicating size configurations for blocks, as well as parameters for executing compare operations on such blocks. One very particular example of a possible format for a configuration register set (908-0 and/or 908-1) is shown in FIG. 9B, and will be described in more detail below.

A data bus 906 can provide a data path between banks (908-0 and 908-1) and a data register 910, an instruction register 912, and a result register 914. In one particular arrangement, data register 906 can store incoming compare data values, incoming write data values (both record values, search key segments, and configuration values for configuration registers), incoming address values, and outgoing read data values. An instruction register 912 can store a received instruction (e.g., command) for subsequent decoding. A result register 914 can store a result value output from each bank (908-0 and 908-1) generated in response to a compare instruction command.

Preferably, all portions of processor device 900 shown in FIG. 9A are formed in a common integrated circuit substrate. In such an arrangement, search key values can be compared with stored data values in physical blocks (902-00 to 902-1n) at very high rates.

Referring to FIG. 9B one particular example of configuration register set is shown in table format. The configuration register set of FIG. 9B can be included in register sets (904-0 and 904-1) shown in FIG. 9A. As shown, there can be a device configuration register for each bank, a number of logical table registers for each bank (in this particular example 32 registers accessible at addresses 005F(hex) to 0040(hex)), and a block configuration register for each block of the bank (in this particular example, 16 blocks per bank). One particular example of a device configuration register is shown in FIG. 9C. One particular example of a logical table register is shown in FIG. 9D. One particular example of a block configuration register is shown in FIG. 9E.

Referring to FIG. 9C, the particular example of a device configuration register can include a key persistence field (BLOCK KEY PERSISTENCE) and a compare on any segment field (COMPARE ON ANY SEGMENT). A key persistence field can enable segment registers for each physical block to retain a last written search key segment value. A compare on any segment field can enable compare operations to be issued on any segment as described herein. As but one example, such a register setting can enable a decoder 806 in the arrangement of FIG. 8A to activate any of its output signals. A compare on any segment field can allow compare operations to occur with the write of any search key segment. As but one example, in the arrangement of FIG. 8A, such a register setting can enable command decoder 802 to generate an index accessing value for accessing table register 804.

Referring to FIG. 9D, an exemplary logical table register entry can include a number of fields, including a compare segment field, a logical table ID field, and a logical table ID mask field. A compare segment field can identify a search key segment with which a compare operation will be initiated. The particular example of FIG. 9D shows an arrangement having eight segments (as opposed to four in FIG. 8A). A logical table ID field can identify blocks to be accessed in a search operation. In particular, a value stored in the logical table ID field can be compared against logical table IDs corresponding to each memory cell block. A logical table ID mask can allow masking of logic table ID value bits in such a compare operation.

Referring to FIG. 9E, an exemplary a block configuration register entry can include a logical table ID field and a block width field. As noted above, a logical table ID field can be compared against a similar value in a logical table register accessed by a compare operation. Such a comparison can determine if the physical block is to be included in the compare operation. A width field can indicate a logical grouping of segment storage locations in a physical block that can thereby establish a record size for the block.

In this way, a device can include a register set that can having device configuration registers that enable different search key segments for multiple physical blocks to retain search key values, logical table registers that can indicate a register segment written to in a compare operation, and block configuration registers that can indicate a record size for a physical block.

Processor devices according to the various embodiments can allow for advantageous operations that can search on any segment in response to a single command. This is in contrast to conventional arrangements that always search on a same segment. Accordingly, embodiments of the invention can include single compare commands can be issued to search any segment of a multi-segment search key data. Examples of such commands are shown in FIGS. 10A and 10B.

FIG. 10A shows examples of compare commands that can access a logical table register that can store the value of a segment upon which a compare command can be issued. In one very particular arrangement, such a command can be decoded an executed in an arrangement like that of FIG. 8B. That is, the command can access a table entry that indicates upon which a compare segment a compare operation can be executed.

FIG. 10B shows an example of compare commands that can directly indicate a register segment to search on. In one very particular arrangement, such a command can be decoded and executed in an arrangement like that of FIG. 8A (configured for eight search key segments instead of four, however).

In this way, a single compare command can be directed to any segment of a multi-segment search key value.

As noted above, a processor device can include physical blocks composed of locations that each includes a number of CAM cells. Examples of such an arrangement are shown in FIGS. 11A and 11B.

Figure 11A:
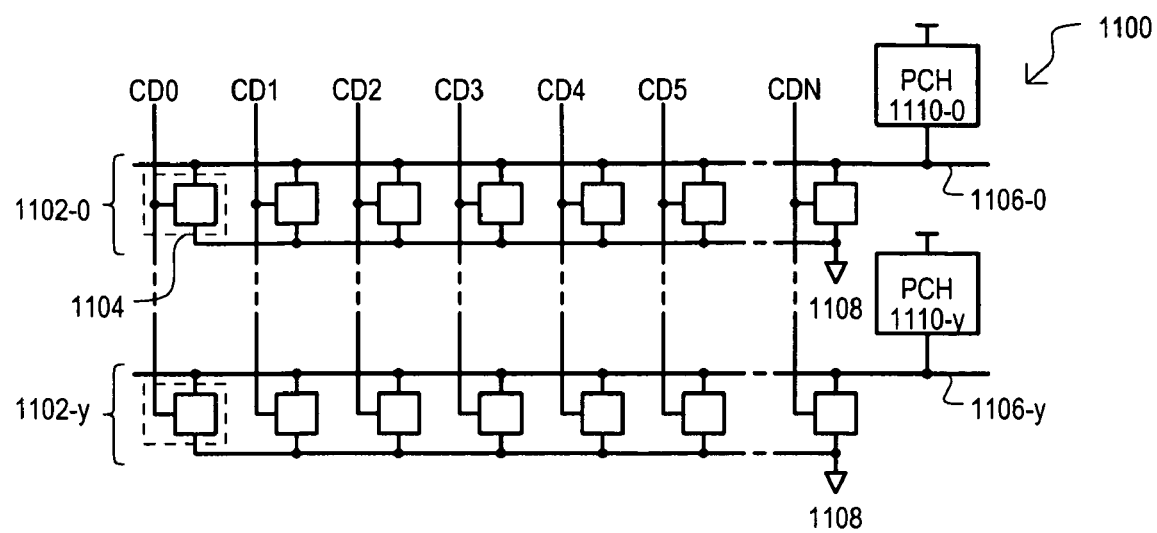
FIGS. 11A and 11B show examples of a content addressable memory (CAM) based physical block according embodiments of the invention.

FIG. 11A shows an example of a CAM cell physical block, designated by the general reference character 1100, that can be included in embodiments of the invention. A CAM cell physical block 1100 can include a number of locations (1102-0 to 1102-*y*). Each location (1102-0 to and 1102-*y*) can include a number of CAM cells, one shown as 1104, arranged between a match line 1106-0 to 1106-*y* and a corresponding discharge node 1108. Each CAM cell (e.g., 1104) can receive a search key portion CD0 to CDN. Each match line (1106-0 to 1106-*y*) can be precharged to a precharge voltage with a corresponding precharge circuit 1110-0 to 1101-*y*. CAM cells (e.g., 1104) can include binary CAM cells, ternary CAM cells, or pseudo ternary CAM cells, as but three examples.

Figure 11B:
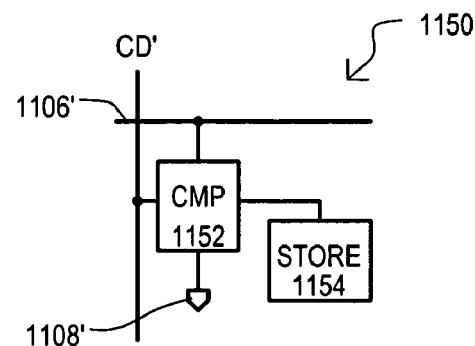

Referring now to FIG. 11B, a CAM cell that can be included in the CAM cell physical block 1100 is shown in a block schematic diagram, and designated by the general reference character 1150. A CAM cell can include a compare circuit 1152 and a store circuit 1154. A compare circuit 1152 can be connected between a match line 1106' and a discharge node 1108'. A compare circuit 1152 can compare a received search key portion CD' to one or more values stored in store circuit 1154. According to the compare result, compare circuit 1152 can enable or disable a path between match line 1106' and discharge node 1108'. A store circuit 1154 can store a portion of a record value, and optionally, a mask value. A mask value can force a compare operation to a particular result.

It is understood that the embodiments of the invention may be practiced in the absence of an element and or step not specifically disclosed. That is, an inventive feature of the invention can be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A processor device integrated circuit, comprising:
   a plurality of storage locations logically configurable into a plurality of databases comprising a plurality of records, each database record having a selectable size of up to F multi-bit segments, where F is an integer greater than one;
   a search key store corresponding to each database that stores a search key segment value in at least one of F multi-bit key segment locations, the at least one segment location being selectable from among any of the segment locations according to a segment selection value; and
   a search key application circuit that applies a search key value of up to F multi-bit segments to each database in response to receiving the search key segment value, the one search key segment being applied as any of the F multi-bit segments according to the segment selection value.

2. The processor device integrated circuit of claim 1, wherein:
   F is at least four.

3. The processor device of claim 1, wherein:
   the search key application circuit simultaneously searches multiple databases of different record sizes in response to receiving the same one search key segment value.

4. The processor device integrated circuit of claim 1, wherein:
   the plurality of storage locations and search key application circuit are formed in a common integrated circuit substrate.

5. The processor device integrated circuit of claim 1, wherein:
   each storage location comprises a plurality of content addressable memory (CAM) cells, each CAM cell including at least one storage circuit and a compare circuit.

6. The processor device integrated circuit of claim 1, wherein:
   the plurality of storage locations comprise a plurality of physical blocks, each formed in a different area of an integrated circuit substrate; and
   the search key application circuit includes at least one set of F multi-bit key segment storage circuits coupled to receive search key data from a data bus.

7. The processor device integrated circuit of claim 6, wherein:
   each search key store includes a different set of F multi-bit key segment storage circuits corresponding to each physical block, each key segment storage circuit coupled to receive a search key segment value from the data bus in response to signal at a control input, and a block key control circuit corresponding to each physical block that provides a separate segment control signal to each different control input of the key segment storage circuits.

8. The processor device integrated circuit of claim 7, further including:

a block size storage circuit corresponding to each physical block; and each block key control circuit activates different combinations of segment control signals in a compare operation depending upon a value stored in the block size storage circuit of the corresponding physical block.

9. The processor device integrated circuit of claim 1, wherein:

the search key application circuit includes a logical table store having a plurality of storage locations that provide segment selection values in response to predetermined compare commands.

10. The processor device integrated circuit of claim 1, wherein:

the plurality of storage locations comprise a plurality of physical blocks each formed in a different area of an integrated circuit substrate, each physical block being accessed in response to a compare operation according to a logical table identification (ID) value of the physical block; and each logical table storage location has a field for storing a segment selection value and a logical table ID value.

11. The processor device integrated circuit of claim 10, wherein:

the search key application circuit includes a command decoder that generates segment selection values in response to predetermined write key commands that write search key data but to not initiate a compare operation, and that accesses the logical table store in response to predetermined compare commands that initiate compare operations.

12. A method of searching database records in at least one integrated circuit, comprising the steps of:

providing record storage locations for a plurality of databases, each database having a selectable record size value of up to F multi-bit segments, where F is greater than one;

for each database, providing at least one corresponding search key store having F multi-bit key segment locations; and in response to a compare command and corresponding multi-bit key data value, storing the key data value in at least one of the key segment locations of each search key store, the at least one segment location being selectable from among any of the segment locations according to a compare segment value, and applying a search key value of up to F multi-bit segments to each database, the key data value being applied as any of the F multi-bit segments of the search key value according to the compare segment value.

13. The method of claim 12, wherein:

providing storage locations includes providing a plurality of physical blocks each configurable to store data values having a selectable size of up to F multi-bit segments, grouping physical blocks into logical tables by assigning at least one logical table identification value to a physical block storing a valid database record; and providing a search key store includes providing a block key store for each physical block, each block key store having F multi-bit segment locations.

14. The method of claim 12, wherein:

storing the key data value in any one of the segment locations includes for a database having a record size of one segment, storing the key data value in all segment locations of the corresponding search key store, and for a database having a record size of F segments, storing the key data value in only one segment location of the corresponding search key store, the one segment location being indicated by the compare segment value.

15. The method of claim 14, further including:

in response to a predetermined compare command type and a corresponding multi-bit key data value, accessing a logical table store to access the compare segment value.

16. The method of claim 12, further including:

in response to the compare command and corresponding multi-bit key data value, searching each database with a value stored in the corresponding search key store.

17. A processor integrated circuit device, comprising:

compare means for executing a compare operation on stored record values based on one segment selected from any of multiple segments of at least one search key store circuit, the stored record values having a size configurable between the size of one segment and the size of the search key store circuit;

replication means for replicating a compare data value in multiple segments of a same search key store circuit according to the size of the record values included in the compare operation; and storage means for storing compare data values for application to different groups of stored record values.

18. The processor integrated circuit device of claim 17, further including:

store means for storing compare parameter sets, each compare parameter set including at least a segment select value; and the compare means accesses one of the compare parameter sets in a predetermined type of compare operation, and selects the one segment from the multiple segments based on the segment select value of the compare parameter set.

19. The processor integrated circuit device of claim 18, wherein:

each compare parameter set includes at least a search table identification value;

block means having storage locations configurable between the size of one segment and the size of the search key store circuit, each block means being accessible according to a logical table identification value; and the compare means executes the compare operation on those block means having logical table identification values determined to match the accessed search table identification value.

* * * * *